US010348186B2

(12) United States Patent
Schuler et al.

(10) Patent No.: US 10,348,186 B2
(45) Date of Patent: Jul. 9, 2019

(54) OVERVOLTAGE LIMITING OF AC VOLTAGE GENERATION

(71) Applicant: TRUMPF Huettinger GmbH + Co. KG, Freiburg (DE)

(72) Inventors: Ansgar Schuler, Stegan (DE); Ulrich Richter, Freiburg (DE)

(73) Assignee: TRUMPF Huettinger GmbH + Co. KG, Freiburg (DE)

( * ) Notice: Subject to any disclaimer, the term of this patent is extended or adjusted under 35 U.S.C. 154(b) by 0 days.

(21) Appl. No.: 15/486,383

(22) Filed: Apr. 13, 2017

(65) Prior Publication Data
US 2017/0222543 A1 Aug. 3, 2017

Related U.S. Application Data

(63) Continuation of application No. PCT/EP2015/073998, filed on Oct. 16, 2015.

(30) Foreign Application Priority Data

Oct. 17, 2014 (DE) ........................ 10 2014 115 139

(51) Int. Cl.
*H02M 7/48* (2007.01)
*H02M 1/32* (2007.01)
(Continued)

(52) U.S. Cl.
CPC ............ *H02M 1/32* (2013.01); *H02M 7/003* (2013.01); *H02M 7/06* (2013.01); *H02M 7/48* (2013.01);
(Continued)

(58) Field of Classification Search
CPC .......... H02M 7/42; H02M 7/48; H02M 7/487; H02M 7/493; H02M 7/501; H02M 7/4826;
(Continued)

(56) References Cited

U.S. PATENT DOCUMENTS 4,028,610 A * 6/1977 Cord'homme ...... H02M 7/5233
363/57
6,359,795 B1 * 3/2002 Amantea ............. H02M 1/4258
363/21.01
(Continued)

FOREIGN PATENT DOCUMENTS

CN 102044974 A 5/2011
DE 2051409 A1 4/1972
(Continued)

OTHER PUBLICATIONS

International Search Report from corresponding PCT Application No. PCT/EP2015/073998, dated Feb. 26, 2016, 6 pages.

*Primary Examiner* — Bryan R Perez
(74) *Attorney, Agent, or Firm* — Fish & Richardson P.C.

(57) ABSTRACT

An overvoltage limitation device, for an alternating current (AC) voltage generating system having an inverter circuit unit configured to supply power to a load with dynamic load impedance, includes: input connections for connection to the inverter circuit unit, output connections for connection to an intermediate circuit voltage unit connected to the inverter circuit unit, a rectifier including an alternating current connection and a direct current connection connected to the output connections, and an AC voltage converter including a primary side connected to the input connections and a secondary side connected to the alternating current connection. The overvoltage limitation device is configured such that, when peak values of an AC voltage exceed a first predetermined value at the input connections, power is transported from the input connections via the AC voltage converter and the rectifier to the output connections, and thus the AC voltage is limited to a second predetermined value.

22 Claims, 3 Drawing Sheets

(51) Int. Cl.
*H02M 7/00* (2006.01)
*H02M 7/06* (2006.01)
*H02M 7/5387* (2007.01)

(52) U.S. Cl.
CPC .. *H02M 7/53871* (2013.01); *H02M 2001/325* (2013.01)

(58) Field of Classification Search
CPC ...... H02M 7/49; H02M 7/4807; H02M 7/537; H02M 7/5387; H02M 7/533; H02M 7/53; H02M 7/53871; H02M 1/32; H02M 2001/325; H02M 7/003
See application file for complete search history.

(56) References Cited

U.S. PATENT DOCUMENTS

| | | | | |
|---|---|---|---|---|
| 2007/0170910 A1* | 7/2007 | Chang | ...................... | H01C 1/16 333/172 |
| 2011/0242868 A1* | 10/2011 | Gray | ...................... | H02M 7/537 363/131 |
| 2014/0168825 A1* | 6/2014 | Patel | ...................... | H02P 9/102 361/21 |

FOREIGN PATENT DOCUMENTS

| | | |
|---|---|---|
| DE | 2537299 C2 | 5/1982 |
| DE | 102008025986 A1 | 12/2009 |
| GB | 2297208 A | 7/1996 |
| WO | WO2005074413 A2 | 8/2005 |
| WO | WO2012019834 A2 | 2/2012 |

\* cited by examiner

OVERVOLTAGE LIMITING OF AC VOLTAGE GENERATION

CROSS-REFERENCE TO RELATED APPLICATIONS

This application is a continuation of and claims priority under 35 U.S.C. § 120 to PCT Application No. PCT/EP2015/073998 filed on Oct. 16, 2015, which claims priority to German Application No. DE 10 2014 115 139.9, filed on Oct. 17, 2014. The entire contents of these priority applications are incorporated herein by reference.

TECHNICAL FIELD

The invention relates to methods, devices, and systems for overvoltage limitation of AC voltage generation.

BACKGROUND

Alternating current (AC) voltage generating arrangements are required in diverse cases. Examples include the excitation of plasma, induction heating or mains feed-in. Such loads are also referred to below as "load with dynamic load impedance". Dynamic load impedance is intended to be understood to refer to an impedance which has the property of changing within one or a small number of periods of the AC voltage produced. Some AC voltage generating arrangements which, with high powers greater than 10 kW, produce frequencies greater than 10 Hz, in particular greater than 1 kHz or greater than 10 kHz and with the power produced in this manner, can supply the above-described loads with dynamic load impedance. To produce an AC voltage from a direct current (DC) voltage, a circuit which is known as a bridge circuit is often used. Such a bridge circuit may be supplied by a voltage source, a current source or a power-controlled source with rectified current and voltage. In particular with bridge circuits which are operated with a direct current source, in which a predetermined current is therefore conducted into the bridge circuit, overvoltages may occur at the output of the bridge circuit. These overvoltages may also be transmitted to the input side of the bridge circuit. They can damage the AC voltage generating arrangement. The protection of AC voltage generating arrangements from overvoltages is in particular with dynamic loads a problem which is often addressed with various solutions.

DE102008025986A1 describes an overvoltage protection device having a capacitor which has to be discharged by a discharge circuit. The discharge circuit converts the energy into heat. It has to be monitored with regard to the current carrying capacity as it will otherwise overheat. In addition, this circuit can absorb only a limited amount of energy. Excessively frequent states of overvoltage would overload this circuit.

SUMMARY

The present invention provides methods, devices, and systems for providing overvoltage limitation for AC voltage generation, which can produce an improved overvoltage limitation and limit more frequent or longer-lasting states of overvoltage without overheating.

One aspect of the invention features an overvoltage limitation device (e.g., an overvoltage limiter) provided for an AC voltage generating arrangement (e.g., an AC voltage generator) having an inverter circuit unit configured to supply power to a load with dynamic load impedance. The overvoltage limitation device has:

two input connections for connection to the inverter circuit unit, in particular to an output of the inverter circuit unit or to the load, two output connections for connection to an intermediate circuit voltage unit of the AC voltage generating arrangement, a rectifier which has an alternating current connection and a direct current connection connected to the output connections, an AC voltage converter which has a primary side and a secondary side, where the primary side is connected to the input connections and the secondary side is connected to the alternating current connection of the rectifier. The overvoltage limitation device is configured in such a manner that, when both positive and negative AC voltage peak values exceed a predetermined (or predeterminable) value at the input connections, power is transported from the input connections via the AC voltage converter and the rectifier to the output connections. In this manner, the AC voltage at the input connections can be limited to another predetermined (or predeterminable) value.

In this manner, the energy which is removed at the load side during the voltage limitation can be supplied back into the AC voltage generating arrangement to supply the load. A conventional overvoltage limitation device would have converted the energy removed completely into heat. The overvoltage limitation device according to the invention thus enables a substantially more efficient limitation of the overvoltage. In addition, it can limit the overvoltage for relatively long periods of time. A conventional overvoltage limitation device would have to be deactivated when an upper temperature is exceeded to prevent overheating, and the overvoltage can then damage the components which are intended to be protected, while the overvoltage limitation device according to the invention consequently makes the operation significantly more reliable.

Another aspect of the invention features a method of overvoltage limitation of an output voltage at an output of an AC voltage generating arrangement having an inverter circuit unit by an overvoltage limitation device. The overvoltage limitation device has:

two input connections for connection to the inverter circuit unit, in particular to the output of the inverter circuit unit, or to the load, two output connections for connection to an intermediate circuit voltage unit of the AC voltage generating arrangement, a rectifier which has an alternating current connection and a direct current connection, where the direct current connection of the rectifier device is connected to the output connections, an AC voltage converter which has a primary side and a secondary side, where the primary side is connected to the input connections and the secondary side is connected to the alternating current connection of the rectifier device.

When both positive and negative AC voltage peak values exceed a predetermined value at the input connections, power is transported from the input connections via the AC voltage converter and the rectifier to the output connections and the alternating current voltage at the input connections is thus limited to another predetermined value.

The predetermined value and the another predetermined value may be dependent on each other and in particular be of the same size.

The overvoltage limitation device is configured in such a manner that power is transported only in one direction from the input connections thereof to the output connections thereof and a power transport from output connections to input connections is prevented in the overvoltage limitation device. Particularly reliable operation is thereby possible when supplying the load with AC voltage.

The power which is transported from the input connections via the AC voltage converter and the rectifier to the output connections can in this instance be at least partially supplied to an AC voltage generating device arranged in the AC voltage generating arrangement. The supply of the load with AC voltage is thus substantially more efficient even in the event of overvoltage. Furthermore, more power can be removed, this means that more overvoltage states can be limited than with conventional systems which as a result of the heat development were limited to a relatively low maximum power per time.

The inductance of the overvoltage limitation device measured at the input connections may be less than 600 nH, in particular less than 450 nH. The overvoltage limitation device thus influences the AC voltage generating arrangement during normal operation at AC voltage peak values less than the predetermined value only in a minimal manner and is at the same time very efficient and rapid when the predetermined value is exceeded.

The overvoltage limitation device may be configured in such a manner that the predetermined value and/or the another predetermined value can be or is adjusted by the voltage at the output connections. The predetermined value and/or the another predetermined value can thus be adjusted in a particularly simple and reliable manner.

The overvoltage limitation device may be configured in such a manner that, in the event of an AC voltage with peak values below the predetermined value, no current flows through the rectifier. This makes the overvoltage limitation device and consequently also the operation of the AC voltage generating arrangement particularly reliable.

An impulse-resistant capacitor may be connected to the direct current connection. Consequently, the inductance of the overvoltage limitation device measured at the input connections can become particularly low. Furthermore, the overvoltage limitation device thus reacts in a particularly rapid manner to overvoltages. In addition, the service-life of the overvoltage limitation device is thus increased. The impulse-resistant capacitor can be a capacitor having one or more of the following properties:
  configured for current pulses with peak currents greater than 10 A,
  configured for voltage pulses with peak voltages greater than 100 V,
  configured for voltage increase rate greater than 500 V/µs,
  configured for current increase rate greater than 500 A/µs, and
  having a connection inductance less than 100 nH.

The impulse-resistant capacitor may be constructed from one or more capacitor units which together have a capacitance greater than 20 µF.

The AC voltage converter may have an element which can be magnetized by current flow. This may preferably comprise iron-containing material, e.g., ferritic material. Consequently, the coupling from the primary side to the secondary side can be improved and the overvoltage limitation device can react more quickly.

The overvoltage limitation device may be configured in such a manner that, with an AC voltage with peak values below the predetermined value, only a current for magnetizing the magnetizable element flows. Consequently, the influence of the AC voltage generating arrangement during normal operation can be further reduced.

The overvoltage limitation device may be configured in such a manner that the AC voltage converter device can be, in particular is, directly connected to the inverter circuit unit, in particular without diodes, switches or rectifying elements being interposed. Consequently, the overvoltage limitation device can react even more quickly.

The AC voltage converter may be configured in such a manner that the primary side is galvanically separated from the secondary side. Consequently, the overvoltage limitation device may operate in an even more reliable manner.

The AC voltage converter may have a transformer. The overvoltage limitation device may thus be constructed in a particularly cost-effective and efficient manner.

The AC voltage converter, in particular the transformer, may have a leakage inductance of less than 300 nH. The overvoltage limitation device can thus influence the AC voltage generating arrangement during normal operation at AC voltage peak values less than the predetermined value only in a minimal manner and is at the same time very efficient and rapid when the predetermined value is exceeded.

The AC voltage converter, in particular the transformer, may be configured to carry peak currents greater than 30 A. Consequently, the overvoltage limitation device can transport a very large amount of power within a very short time and can thus better limit the AC voltage even when a large amount of energy has to be transported from the input connections to the output connections.

The AC voltage converter device, in particular the transformer, may be configured in such a manner that the product of the leakage inductance thereof and a peak current for which it is configured is less than 1 mHA (Milli-Henry*Ampere). The overvoltage limitation device can thus operate even more rapidly and more efficiently.

The AC voltage converter, in particular the entire overvoltage limitation device, may have a direct current resistance having a value less than 0.05Ω. The overvoltage limitation device thus becomes, on one hand, more efficient, but also significantly more rapid and produces fewer losses and consequently becomes more reliable.

The transformer may have a primary winding and a secondary winding. The primary and secondary windings may in particular have, in particular include, lines guided in a bifilar manner. The parasitic inductance of the overvoltage limitation device is thereby further reduced.

The primary and the secondary windings may in particular have, in particular include, strip-like lines. The strip-like lines may in particular be at least 10 mm wide and at least 0.05 mm thick. The strip-like lines may in particular be wound so as to be positioned one on the other. In a particular case, the strip-like lines may be insulated by insulation films which are thinner than 0.2 mm. The parasitic inductance of the overvoltage limitation device can be thereby reduced even further.

The connection lines between the rectifier and AC voltage converter may have, in particular include, strip conductors which are strip-like and in particular bifilar, and which in a particularly preferred manner are positioned one on the other and which are separated only by insulation which is thinner than 0.2 mm. They may in particular at least partially be at least 10 mm wide and at least 0.05 mm thick. They may in particular each be shorter than 10 cm. The parasitic inductance of the overvoltage limitation device can be thereby further reduced.

The transformer may be configured in such a manner that the number of windings of the primary winding and the number of windings of the secondary winding differ by a maximum of one winding. The parasitic inductance of the overvoltage limitation device is thereby further reduced.

The overvoltage limitation device may additionally have at least one current flow directing device, in particular a diode.

The current flow directing device may be connected in series between a direct current connection and an output connection.

Another current flow directing device may be connected in series between a direct current connection and another output connection. The overvoltage limitation device may thus be used with the AC voltage generating arrangement with a plurality of intermediate circuit voltage units.

The overvoltage limitation device may have a capacitor pre-charging element for pre-charging the impulse-resistant capacitor. This capacitor pre-charging element may in particular be a resistor element. This capacitor pre-charging element may in particular be connected in parallel with a current flow directing device. The impulse-resistant capacitor can then be pre-charged. This is advantageous when the output of the inverter circuit unit is not intended to be loaded by the charging of the impulse-resistant capacitor.

The rectifier may have a bridge rectifier. The bridge rectifier may be configured to carry currents greater than 30 A. The bridge rectifier may have four diodes in a bridge circuit which are each configured to carry currents greater than 30 A. Consequently, the overvoltage limitation device can transport a very large amount of power within a very short time and can thus better limit the AC voltage even when a large amount of energy has to be transported from the input connections to the output connections.

The connection lines between the impulse-resistant capacitor and the rectifier may have lengths less than 2 cm. The parasitic inductance of the overvoltage limitation device is thereby further reduced.

The AC voltage converter may be configured to transmit a mean power greater than 100 W and peak power levels greater than 50 kW. Consequently, the overvoltage limitation device can transport a very large amount of power within a very short time and can thus better limit the AC voltage even when a large amount of energy has to be transported from the input connections to the output connections.

Another aspect of the invention features a method of limiting AC voltage, including: providing a first predetermined voltage at a direct current connection of a rectifier; conducting power flowing from an AC voltage generator to a primary side of an AC voltage converter, a secondary side of the AC voltage converter being connected to an alternating current connection of the rectifier; and in response to peak values of an AC voltage at the primary side of the AC voltage converter exceeding a value of the first predetermined voltage, transporting the power via the AC voltage converter and the rectifier to the AC voltage generator, such that the AC voltage is limited to a second predetermined value. The method can further include at least partially supplying the power transported via the AC voltage converter and the rectifier to the AC voltage generator.

A further aspect of the invention features an AC voltage generating arrangement (e.g., an AC voltage generator) which is configured to supply a load with dynamic load impedance with power, in particular with AC voltage power, where the AC voltage generating arrangement has one of the above-described overvoltage limitation devices.

The overvoltage limitation device may be connected with the input connections thereof to the output of the AC voltage generating arrangement.

The overvoltage limitation device may be connected with the output connections thereof to an intermediate circuit voltage unit of the AC voltage generating arrangement.

The overvoltage limitation device may be connected with the output connections thereof to a plurality of intermediate circuit voltage units of the alternating current voltage generating arrangement, in particular by one of the current flow directing devices in each case.

The AC voltage generating device may have an inverter circuit unit which is preferably constructed as a bridge circuit to produce power, in particular AC voltage power.

The AC voltage generating arrangement may have a direct current source to supply the bridge circuit. The direct current source may be configured to supply a regulated or controlled current to the bridge circuit.

The direct current source may have a step-up converter.

The direct current source may have a step-down converter.

The direct current source may have a combination of step-down and step-up converters.

The direct current source may have an inductor which limits a current change to values less than 10 A/μs.

The direct current source may be connected to the connection location of the intermediate circuit voltage unit. A DC voltage which is present at the connection location of the intermediate circuit voltage unit may provide the bridge circuit with a regulated or controlled direct current.

The AC voltage generating arrangement may have a resonance circuit, in particular at the output of the bridge circuit.

The AC voltage generating arrangement may be configured in such a manner that the frequency during operation of the AC voltage generating arrangement can be changed and in particular is changed in the event of changes of the impedance of the load.

The AC voltage generating arrangement may be configured to produce power, in particular AC voltage power at a frequency greater than 1 kHz, in particular greater than 10 kHz.

The AC voltage generating arrangement may be configured to produce power, in particular AC voltage power, to supply plasma processes or induction processes.

Embodiments of the invention are illustrated in the schematic drawings and explained in greater detail in the following description.

DETAILED DESCRIPTION

Figure 1:
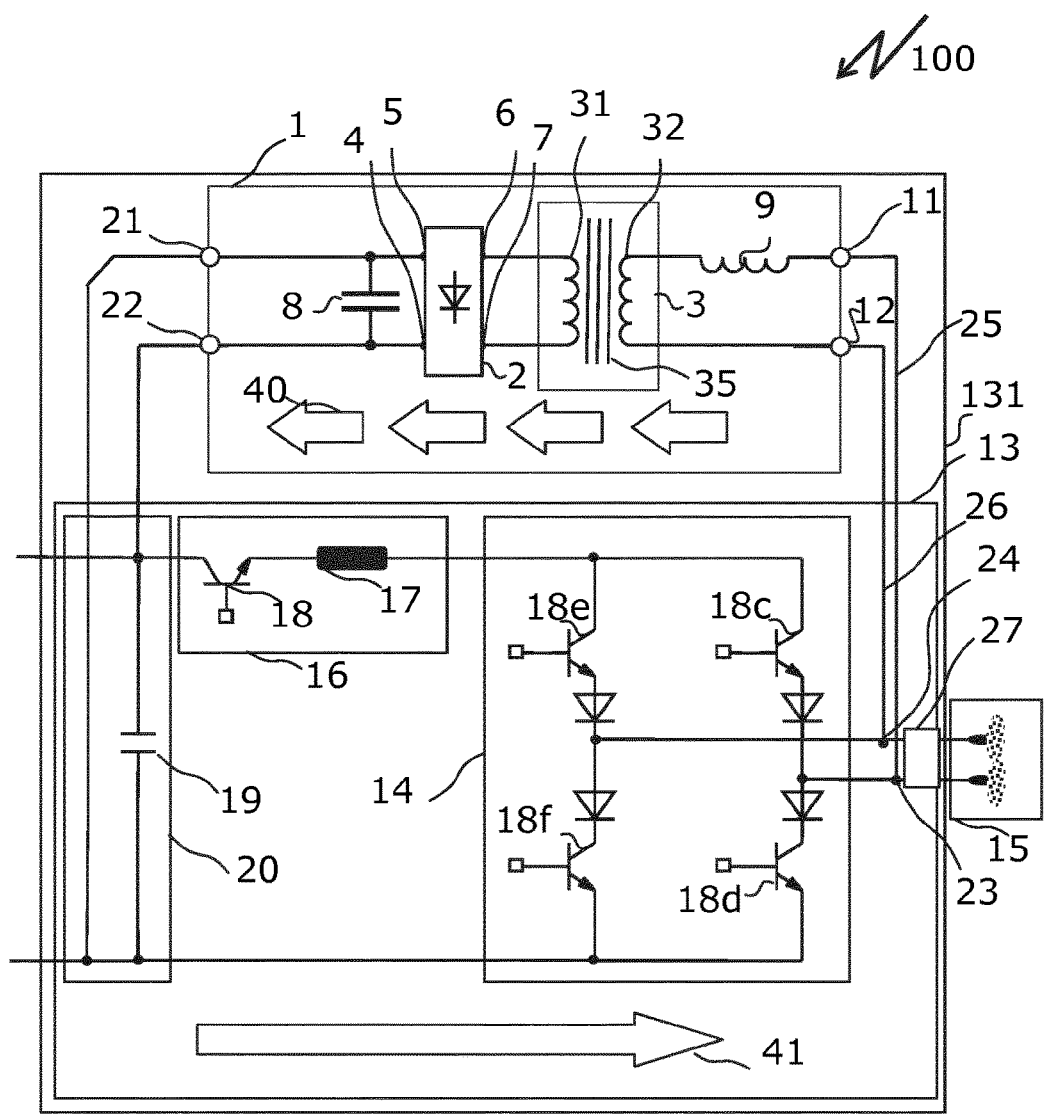
FIG. 1 is a circuit diagram of an example power supply system with an overvoltage limitation device.
Figure 3:
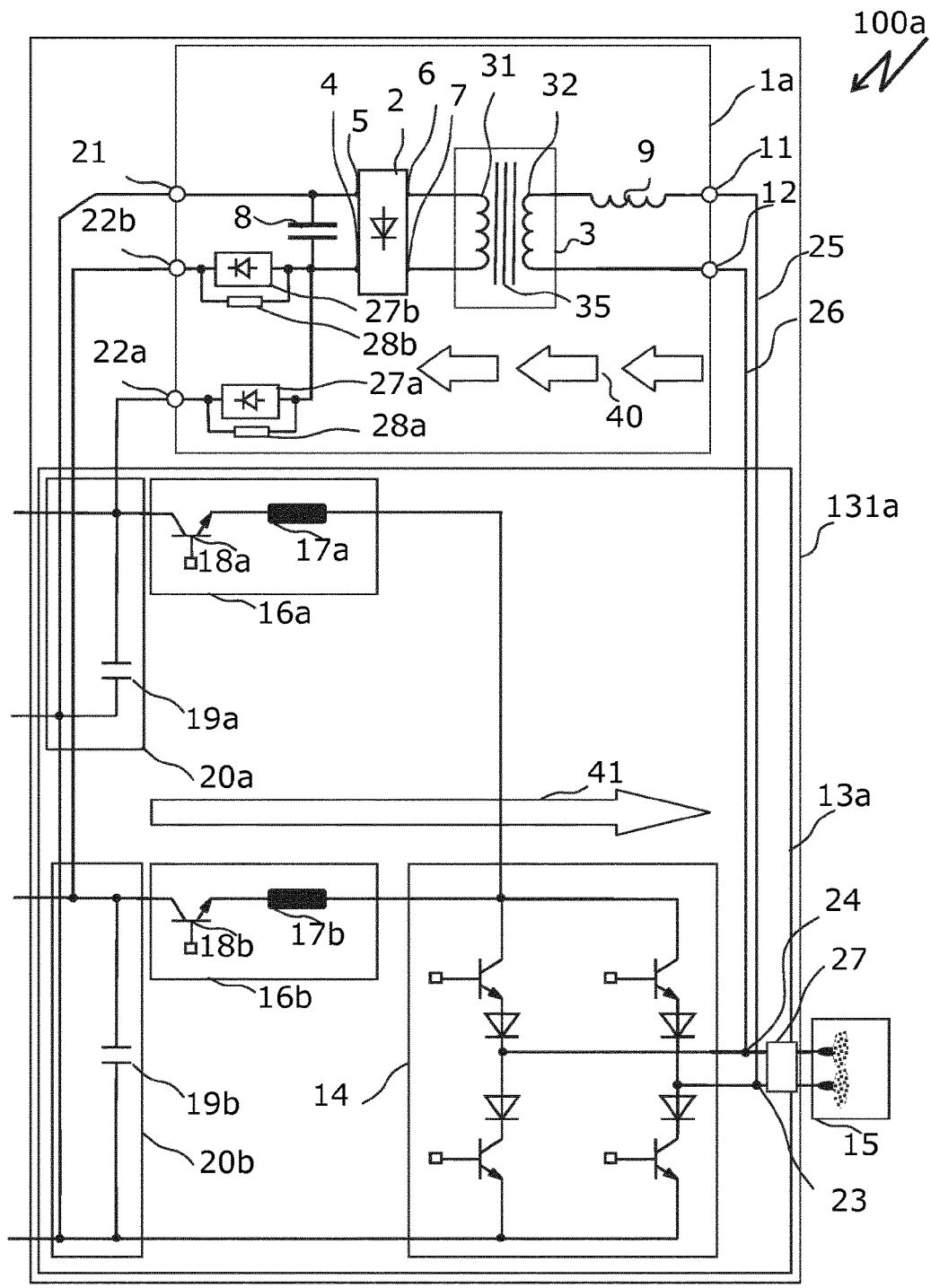
FIG. 3 is a circuit diagram of another example power supply system with an overvoltage limitation device.

FIGS. 1 and 3 show in each case a circuit diagram of a power supply system 100, 100a. The power supply system 100, 100a has a load 15 with dynamic load impedance. The load 15 may be configured as a plasma process. The power supply system 100, 100*a* is then a plasma power supply system. The power supply system 100, 100*a* has an AC voltage generating arrangement 131, 131*a* which itself has an AC voltage generating device 13, 13*a* and an overvoltage limitation device 1, 1*a*.

Figure 2:
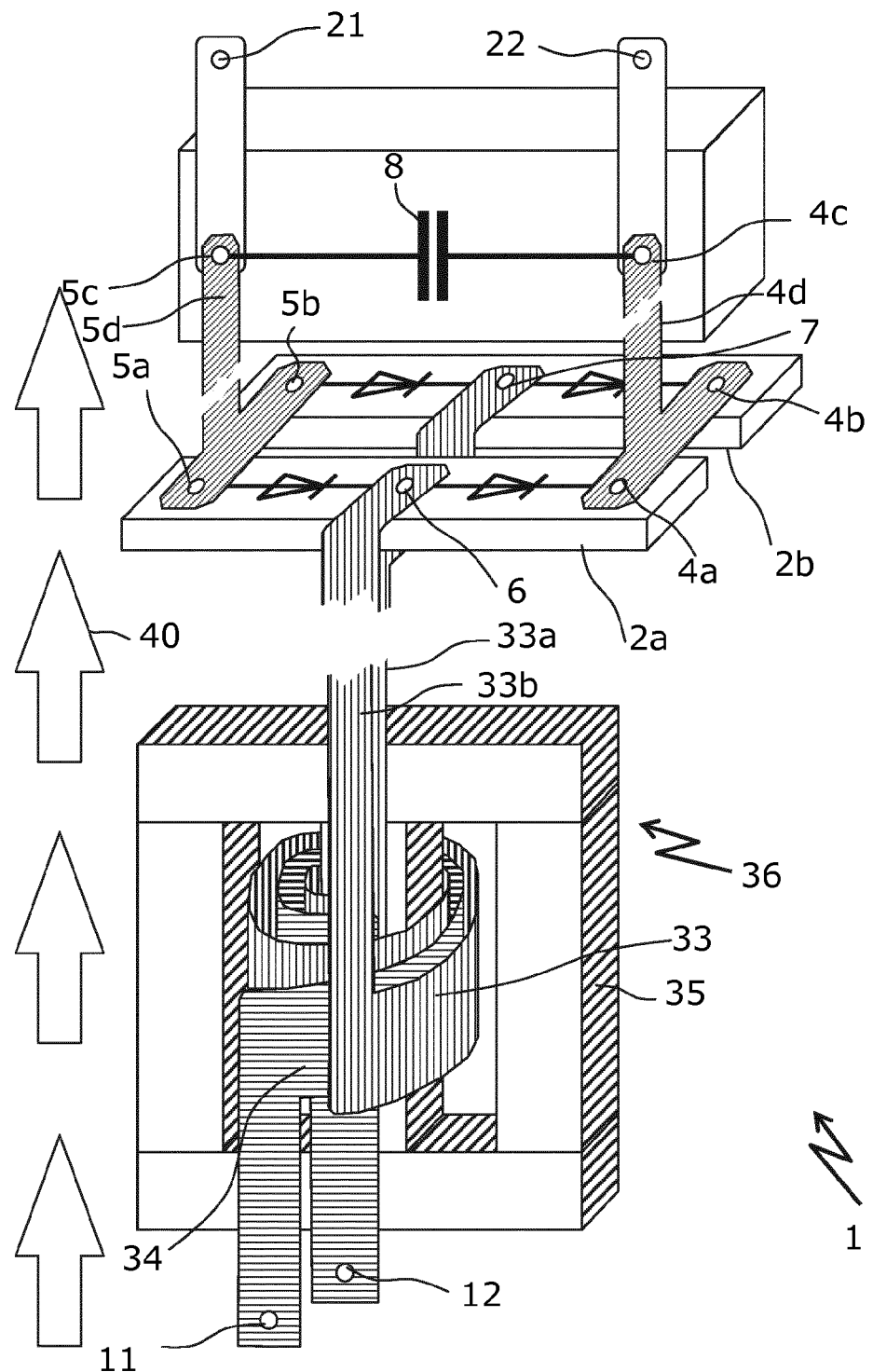
FIG. 2 is a drawing of an example overvoltage limitation device.

FIG. 2 is a drawing of an overvoltage limitation device 1, 1*a*. For the same components, the same reference numerals are used in FIGS. 1, 2 and 3.

The AC voltage generating device 13 from FIG. 1 has an intermediate circuit voltage unit 20 in which an intermediate circuit capacitor 19 is arranged. The AC voltage generating device 13 further has a direct current source 16 which has a transistor 18 and an inductor 17. The direct current source 16 is connected to the intermediate circuit voltage unit 20 and converts power from a DC voltage source which is supplied from the intermediate circuit voltage unit 20 into a power which supplies direct current, that is, controlled or regulated current, in place of controlled or regulated voltage. The direct current source 16 is in the present embodiment a step-down converter. It may in an alternative embodiment also be configured as a step-up converter or as a combination of both converters.

The AC voltage generating device 13, 13*a* further has an inverter circuit unit 14 which in this instance is constructed as a full bridge circuit which has four transistors 18*c*-18*f*. Optionally, a diode may be connected in series to each of the four transistors 18*c*-18*f*. The inverter circuit unit 14 is connected to the direct current source 16. It is accordingly provided with a direct current source, that is, a power source, whose current is controlled or regulated. The inverter circuit unit 14 preferably produces a pulsed alternating current at the output connections 23, 24 thereof.

The AC voltage generating device 13, 13*a* further has in the present embodiments an optional resonance circuit 27 which is connected to the output connections 23, 24 of the inverter circuit unit 14. This resonance circuit 27 may have one or more oscillating circuit inductors and one or more oscillating circuit capacitors which are connected in parallel and/or in series to form an oscillating circuit and are configured in such a manner that the oscillating circuit has a resonance at an adjustable frequency of the inverter circuit unit 14. It is thus possible in a very efficient manner to produce a high voltage and/or a high current. The resonance circuit 27 may also be configured to carry out an impedance matching from the inverter circuit unit 14 to the load 15. The resonance circuit 27 may also be configured to filter the alternating current signal at the output of the inverter circuit unit 14 and thus to keep undesirable frequencies away from the load 15. The resonance circuit 27 may have a transformer. Alternatively or additionally to the resonance circuit 27, at this location a transformer with a rectifier or other network components may also be provided. This may be suitable for galvanic separation between the intermediate circuit voltage unit 20 and the connections to the load 15.

The overvoltage limitation device 1, 1*a* has two input connections 11, 12 for connection to the inverter circuit unit 14. The overvoltage limitation device 1 from FIG. 1 further has two output connections 21, 22 for connection to the intermediate circuit voltage unit 20 of the AC voltage generating device 13.

The overvoltage limitation device 1, 1*a* further has a rectifier 2 which has an alternating current connection 6, 7 and a direct current connection 4, 5. The direct current connection 4, 5 of the overvoltage limitation device 1 from FIG. 1 is connected to the output connections 21, 22.

FIG. 2 shows a rectifier which has two half-bridge rectifiers 2*a*, 2*b*. These are connected to connection elements 5*d*, 4*d*.

The overvoltage limitation device 1, 1*a* further has an AC voltage converter 3 which has a primary side 32 and a secondary side 31. The primary side 32 is connected to the input connections 11, 12. The secondary side 31 is connected to the alternating current connection 6, 7 of the rectifier 2.

The AC voltage converter 3 includes in the present embodiment a transformer 36. The transformer 36 has at the primary side 32 a primary winding 34. It further has at the secondary side 31 a secondary winding 33. The primary and the secondary windings 34, 33 are strip-like lines which are guided in a bifilar manner. The strip-like lines are more than 10 times wider than a thickness of the strip-like lines, e.g., at least 10 mm wide and at least 0.05 mm thick. The strip-like lines are wound so as to be positioned one on the other.

FIG. 2 shows an embodiment of the transformer 36 in which the secondary winding 33 has one winding more than the primary winding 34. An insulation between the secondary winding 33 and primary winding 34 is not shown in FIG. 2 and is configured to insulate a voltage, for example, greater than 1000 V.

The AC voltage converter 3 which is constructed as a transformer 36 may also have a secondary winding 33 with a central tap. A combination of two diodes can be used as a rectifier 2. The primary and secondary windings 33, 34 may then be constructed in a trifilar manner.

The AC voltage converter 3 has a magnetizable element 35 which in the embodiment in FIG. 2 is constructed as an iron-containing transformer core. For frequencies greater than 1 kHz, a transformer core of ferritic material may be used.

As a result of the connection lines between the rectifier 2 and the AC voltage converter 3, in particular when it is constructed as a transformer, there is produced a parasitic inductor, as illustrated in FIGS. 1 and 3 as an inductor 9, which should be as low as possible. As a result of a low-inductance construction with high magnetic coupling in the transformer, the leakage inductance can be kept lower than 300 nH.

The overvoltage limitation device 1, 1*a* further has an optional impulse-resistant capacitor 8. It is connected to the direct current connection 4, 5 in the immediate vicinity of the rectifier 2. This impulse-resistant capacitor 8 does not necessarily have to be provided. When the dimensions of the AC voltage generating arrangement 131, 131*a* permit and the intermediate circuit capacitor 19, 19*a*, 19*b* is accordingly configured, the intermediate circuit capacitor 19, 19*a*, 19*b* can be used for the function of the impulse-resistant capacitor 8. However, when the lines from the rectifier 2 to the intermediate circuit capacitor 19, 19*a*, 19*b* are too long to achieve the low overall inductance of the overvoltage limitation device 1, 1*a*, such an impulse-resistant capacitor 8 in the immediate vicinity of the rectifier device 2 can be utilized. An impulse-resistant capacitor is intended to be understood to be a capacitor which can have one or more of the following properties:

configured for voltage increase rate greater than 500 V/µs,
configured for current increase rate greater than 500 A/µs, and
having a connection inductance less than 100 nH.

The connection elements 5*d*, 4*d* shown in FIG. 2 connect, on one hand, the half-bridge rectifier 2*a*, 2*b* to the connections 5*a*, 5*b*, 4*a*, 4*b* and thus combine the half-bridge rectifiers 2*a*, 2*b* to form a full-bridge rectifier. On the other hand, they also connect the connections 5a, 5b, 4a, 4b of the half-bridge rectifier 2a, 2b to the connections 5c, 4c of the impulse-resistant capacitor 8.

The connection lines between the rectifier device 2 and the AC voltage converter device 3 are in FIG. 2 the strip-like conductor strips 33a, 33b of the secondary winding 33 which are guided directly out of the transformer.

The first input connection 11 of the overvoltage limitation device 1, 1a is connected by a first connection line 25 to the first output connection 23 of the inverter circuit unit 14 and is thus connected to the load 15. The second input connection 12 is connected by a second connection line 26 to the second output connection 24 of the inverter circuit unit 14 and is thus connected to the load 15. The optional resonance circuit 27 is in the present embodiment connected between the output connections 23, 24 of the inverter circuit unit 14 and the load 15. Alternatively, the connection lines 25, 26 may also be connected closer to the load 15, that is, between the optional resonance circuit 27 and load 15 or, for example, directly to an oscillation circuit capacitor in the resonance circuit 27. The connection lines 25, 26 are configured to have the lowest possible inductance. They are preferably shorter than 30 cm, in particular guided in a bifilar manner. In addition, they are configured to have the lowest possible direct current resistance and have in particular the largest possible cross-section, in particular greater than 2 mm$^2$.

FIG. 3 shows the circuit diagram of the power supply system 100 from FIG. 1 supplemented to form an expanded power supply system 100a.

The AC voltage generating arrangement 131a has in this instance an expanded overvoltage limitation device 1a and an expanded AC voltage generating device 13a.

The expanded AC voltage generating device 13a has two intermediate circuit voltage units 20a, 20b and two direct current sources 16a, 16b which are constructed as step-down converters. The intermediate circuit voltage units 20a, 20b each have an intermediate circuit capacitor 19a, 19b. The direct current sources 16a, 16b each have a transistor 18a, 18b and in each case an inductor 17a, 17b. The direct current sources 16a, 16b are connected at the outputs thereof. In this manner, the AC voltage generating device 13a may be constructed in a modular manner for different power levels. The voltages at the intermediate circuit capacitor 19a, 19b are not necessarily of the same size. Consequently, the overvoltage limitation device 1 from FIG. 1 can be used with additional wiring. The intermediate circuit voltage units 20a, 20b can then be controlled independently from each other.

The overvoltage limitation device 1a has in this instance, in place of the one output connection 22, two output connections 22a, 22b. These are connected in each case to an intermediate circuit voltage unit 20a, 20b. To decouple the two potentially different intermediate circuit voltages at the intermediate circuit capacitors 19a, 19b, current flow directing devices 27a, 27b, which are constructed as diodes, are provided in the overvoltage limitation device 1a in series between one of the direct current connections 4 and one of the output connections 22a, 22b in each case. In such a way, the impulse-resistant capacitor 8 can be charged to the voltage which is present at the intermediate circuit capacitors 19a, 19b. Two capacitor pre-charging elements 28a, 28b which are constructed as resistors can be additionally provided. These are not absolutely necessary even if current flow directing devices 27a, 27b are provided in the overvoltage limitation device 1a in series between one of the direct current connections 4 and each of the output connections 22a, 22b. The impulse-resistant capacitor 8 may also be charged by the inverter circuit unit 14 via the AC voltage converter 3 and the rectifier 2. Thus, if the capacitor pre-charging elements 28a, 28b are provided, the inverter circuit unit 14 can be not loaded when the impulse-resistant capacitor 8 has to be charged. In this manner, the impedance of the load 15 can be established in a more precise and rapid manner at the output of the inverter circuit unit 14.

Each of the transistors 18, 18a-18f can be constructed as an insulated-gate bipolar transistor (IGBT), a metal-oxide-semiconductor field-effect transistor (MOSFET) or in another form and additionally each have an anti-parallel diode which is not shown in FIGS. 1 and 3. In place of the transistors 18, 18a-18f, another structural switching element can also be used, for example, a thyristor, a gate turn-off thyristor (GTO) or other power switching structural elements.

The operating method of the overvoltage limitation device 1, 1a is as follows. Firstly, the impulse-resistant capacitor 8 is charged to a voltage that is present at the intermediate circuit capacitor 19, 19a, 19b of the intermediate circuit voltage unit 20, 20a, 20b.

If different voltages are present at the intermediate circuit capacitor 19a, 19b of the intermediate circuit voltage units 20a, 20b, the impulse-resistant capacitor 8 is charged to the lower of the two different voltages.

Consequently, a predetermined voltage is present at the direct current connection 4, 5 of the rectifier 2. If no impulse-resistant capacitor 8 is provided, the voltage of the intermediate circuit capacitor 19 or the intermediate circuit capacitors 19a, 19b is present at the direct current connection 4, 5 of the rectifier device 2. The AC voltage to be limited, e.g., a voltage of an oscillation circuit capacitor of a resonance circuit 27 or a voltage at the output of the inverter circuit unit 14, is connected to the input connections 11, 12 of the overvoltage limitation devices 1, 1a.

Through the primary side 32 of the AC voltage converter 3 or the primary winding 34 of the transformer 26 a current now flows, caused by the AC voltage which is connected to the input connections 11, 12.

As a result of the AC voltage at the primary side 32 of the AC voltage converter 3, an AC voltage is produced at the secondary side 31.

The voltage at the secondary side 31 is applied to the rectifier 2 at the alternating current connection 6, 7.

As long as the magnitude of the voltage at the alternating current connection 6, 7 is lower than the voltage at the direct current connection 4, 5, the rectifier 2 prevents a current flow into the rectifier device 2. This current flow can have an influence on the AC voltage which is present at the input and to be limited. However, since the current flow is prevented, the AC voltage which is present at the input and to be limited is not influenced.

If the AC voltage to be limited at the input connections 11, 12 of the overvoltage limitation device 1, 1a increases above a predetermined value, the rectifier 2 permits a current flow. This predetermined value can be adjusted by the voltage present at the direct current connection 4, 5 of the rectifier 2.

The voltage at the output of the rectifier 2 is limited to the intermediate circuit voltage present at the impulse-resistant capacitor 8 or the intermediate circuit capacitor 19, 19a, 19b. Power is transported from the two input connections 11, 12 via the AC voltage converter 3 and the rectifier 2 to the output connections 21, 22. This is indicated in FIGS. 1, 2 and 3 with arrows 40. In this manner, the AC voltage at the input connections 11, 12 can be limited to another predetermined (or predeterminable) value. The energy which is directed in this instance into the impulse-resistant capacitor 8 or into the intermediate circuit capacitor 19, 19a, 19b can then be supplied again to the AC voltage generating device 13, 13a of the inverter circuit unit 14.

Only a small portion of the excess energy provided by the AC voltage which is intended to be limited is thereby converted into heat.

The overvoltage limitation device 1, 1a is in this instance configured in such a manner that no power can flow in a direction counter to the indicated arrow 40. This is ensured in particular by the construction of the rectifier 2.

The operating method of the AC voltage generating arrangement 131, 131a which is provided with the overvoltage limitation device 1, 1a can be described as follows: the AC voltage generating arrangement 131, 131a converts DC voltage power from the intermediate circuit voltage unit(s) 20, 20a, 20b in the AC voltage generating device 13, 13a initially into a direct current and directs the direct current generated in this manner to the inverter circuit unit 14 which produces an AC voltage and an alternating current. The DC voltage power is thus converted into alternating current power.

The power, in particular the alternating current power, is supplied to the load 15. An energy or power flow is produced in a direction of the arrow 41 from the intermediate circuit voltage unit(s) 20, 20a, 20b to the inverter circuit unit 14 and subsequently in particular to the load 15. As a result of the dynamic impedance of the load 15, excess voltages may occur and, for example, could damage the inverter circuit unit 14. Such excess voltages are as described above limited to permissible values with the overvoltage limitation device 1, 1a.

The arrow 41 is illustrated as a long continuous arrow. It is intended to be indicated that normally a continuous power or energy flow through the AC voltage generating device 13, 13a flows in the direction of the arrow 41. In contrast, the arrow 40 is illustrated as an interrupted or broken arrow. It is intended to be indicated that only when the voltage to be limited has exceeded a predetermined value, a power or energy flow flows through the overvoltage limitation device 1, 1a in the direction of the arrow 40.

There is described a method and a device for overvoltage limitation of an output voltage at the output of an AC voltage generating arrangement 131 with an inverter circuit unit 14 by an overvoltage limitation device 1. The overvoltage limitation device has:

two input connections 11, 12 for connection to the inverter circuit unit, two output connections 21, 22 for connection to an intermediate circuit voltage unit 20 of the AC voltage generating arrangement, a rectifier 2 connected to the output connections, and an AC voltage converter 3 connected to the input connections and the rectifier.

When positive AC voltage peak values and negative AC voltage peak values exceed a predetermined value at the input connections, power is transported from the input connections via the AC voltage converter and the rectifier to the output connections and the AC voltage at the input connections is thus limited to an additional predetermined (or predeterminable) value.

A number of embodiments of the invention have been described. Nevertheless, it will be understood that various modifications may be made without departing from the spirit and scope of the invention. Accordingly, other embodiments are within the scope of the following claims.

What is claimed is:

1. An overvoltage limiter for an alternating current (AC) voltage generator having an inverter circuit unit configured to supply power to a load with dynamic load impedance, wherein the overvoltage limiter comprises:
   input connections for connection to the inverter circuit unit;
   output connections for connection to an intermediate circuit voltage unit that is connected to the inverter circuit unit in the AC voltage generator and configured to provide a DC voltage;
   a rectifier including an alternating current connection and a direct current connection that is connected to the output connections; and
   an AC voltage converter including:
      a primary side connected to the input connections and configured to receive an AC voltage, and
      a secondary side connected to the alternating current connection of the rectifier,
   wherein the overvoltage limiter is configured such that, when peak values of the AC voltage exceed a first predetermined value at the input connections, power is transported from the input connections via the AC voltage converter and the rectifier to the output connections, and then the AC voltage at the input connections is limited to a second predetermined value.

2. The overvoltage limiter of claim 1, wherein an inductance at the input connections is less than 450 nH.

3. The overvoltage limiter of claim 1, wherein the AC voltage converter comprises a transformer having a primary winding on the primary side and a secondary winding on the secondary side.

4. The overvoltage limiter of claim 3, wherein the primary winding and the secondary winding each have lines that are strip-like and guided in a bifilar manner.

5. The overvoltage limiter of claim 3, wherein the transformer is constructed such that a number of windings of the primary winding and a number of windings of the secondary winding differ by a maximum of one winding.

6. The overvoltage limiter of claim 1, wherein the AC voltage converter is configured to have a leakage inductance less than 300 nH and carry a peak current greater than 30 A.

7. The overvoltage limiter of claim 1, wherein the AC voltage converter is configured to have a direct current resistance less than 0.05 Ω.

8. The overvoltage limiter of claim 1, further comprising at least one current flow director connected in series between the direct current connection of the rectifier and one of the output connections.

9. The overvoltage limiter of claim 1, further comprising an impulse-resistant capacitor connected to the direct current connection of the rectifier.

10. The overvoltage limiter of claim 9, wherein the impulse-resistant capacitor comprises one or more capacitor units which together have a capacitance greater than 20 μF.

11. The overvoltage limiter of claim 9, further comprising connection lines connected between the impulse-resistant capacitor and the rectifier,
   wherein the connection lines each have lengths shorter than 2 cm.

12. The overvoltage limiter of claim 1, wherein the overvoltage limiter is configured such that, when peak values of the AC voltage are below the first predetermined value, no current flows through the rectifier.

13. The overvoltage limiter of claim 1, wherein the AC voltage converter has an element magnetizable by current flow, and wherein the overvoltage limiter is configured such that, with the AC voltage with peak values below the first predetermined value, only a current for magnetizing the element flows.

14. The overvoltage limiter of claim 1, wherein the AC voltage converter is configured to be directly connected to the inverter circuit unit.

15. The overvoltage limiter of claim 1, wherein the AC voltage converter is configured such that a product of a leakage inductance of the AC voltage converter and a peak current for the leakage inductance is less than 1 mHA.

16. The overvoltage limiter of claim 1, further comprising connection lines connected between the rectifier and AC voltage converter,
wherein the connection lines comprise strip conductors that are bifilar and positioned one on the other.

17. The overvoltage limiter of claim 16, wherein the strip conductors are separated only by insulator that is thinner than 0.2 mm, at least partially at least 10 mm wide, and at least 0.05 mm thick, and
wherein the strip conductors are each shorter than 10 cm.

18. The overvoltage limiter of claim 1, wherein the intermediate circuit voltage circuit is configured to provide the DC voltage to a direct current source that is configured to convert the DC voltage into a direct current to be supplied to the inverter circuit unit.

19. An AC voltage generator comprising:
an inverter circuit unit configured to supply power to a load with dynamic load impedance;
an intermediate circuit voltage unit connected to the inverter circuit unit and configured to provide a DC voltage; and
an overvoltage limiter comprising:
input connections for connection to the inverter circuit unit;
output connections for connection to the intermediate circuit voltage unit;
a rectifier including an alternating current connection and a direct current connection that is connected to the output connections; and
an AC voltage converter including:
a primary side connected to the input connections and configured to receive an AC voltage and
a secondary side connected to the alternating current connection of the rectifier,
wherein the overvoltage limiter is configured such that, when peak values of the AC voltage exceed a first predetermined value at the input connections, power is transported from the input connections via the AC voltage converter and the rectifier to the output connections, and then the AC voltage at the input connections is limited to a second predetermined value.

20. The AC voltage generator of claim 19, further comprising a direct current source coupled between the intermediate circuit voltage unit and inverter circuit unit and configured to convert power from a DC voltage source supplied from the intermediate circuit voltage unit into a power which supplies direct current.

21. A method of limiting AC voltage, comprising:
providing a first predetermined voltage at a direct current connection of a rectifier;
conducting power flowing from an AC voltage generator to a primary side of an AC voltage converter, a secondary side of the AC voltage converter being connected to an alternating current connection of the rectifier; and
in response to peak values of an AC voltage received at the primary side of the AC voltage converter exceeding a value of the first predetermined voltage, transporting the power via the AC voltage converter and the rectifier to an intermediate circuit voltage unit of the AC voltage generator that is configured to provide a DC voltage, such that the AC voltage is limited to a second predetermined value.

22. The method of claim 21, further comprising at least partially supplying the power transported via the AC voltage converter and the rectifier to the AC voltage generator.

* * * * *